Jan. 29, 1952     L. M. TAYLOR     2,583,903
DENTAL CLAMP
Filed May 15, 1950

LENORE M. TAYLOR
Inventor

By *Smith & Tuck*
Attorneys

Patented Jan. 29, 1952

2,583,903

UNITED STATES PATENT OFFICE 2,583,903

DENTAL CLAMP

Lenore M. Taylor, Seattle, Wash.

Application May 15, 1950, Serial No. 162,084

5 Claims. (Cl. 32—63)

This invention relates to a dental clamp and more particularly, to a clamp for holding a tray element to a tooth being filled and in which joinder with the tooth is obtained by operating in the intermaxillary spaces at the sides of the tooth.

In general, the filling of a tooth by the use of the newer plastic materials has been accompanied by difficulty in obtaining suitable holding pressures during the reaction period of the filler while it is setting up. It is important that pressure be applied steadily and uniformly over a fairly long period of time after the filler has been placed in a tooth cavity during which, in the case of plastics, solidification or polymerization takes place. Ordinarily a dentist or his assistant is required to press a metallic or other rigid pad against the filler and tooth for about 5 to 15 minutes. Such can become extremely tedious to such an extent that a person may vary the pressures or their direction of force and spoil the filling and cause it to improperly set. Additionally such pressure maintenance unduly takes the person away from other and, possibly, more urgent work. In attempting to solve the problem I have considered dental matrix holders and other manners of tools available in the dental art but have failed to find such a tool that simply and inexpensively serves my purposes while at the same time is adaptable to the many contours and tooth conditions encountered, that applies the desired pressures in an approved manner, and which in all respects serves my ends.

Therefore, having in mind the difficulties enumerated above, and, others that will be apparent to those skilled in dentistry, the following have been the objects of this invention: to provide a dental clamp that is simple to construct, easy to use, accurate in the application of even pressure to a tooth filling, that is operable on the inner and side as well as outer surfaces of a tooth, that may be simply adapted to accommodate a variety of situations, that is easily and simply sterilized, and which, having been placed in clamping position need not be attended by the dentist or assistant during the reaction period of the filler.

Other objects and advantages of the invention will be more apparent as the specification proceeds.

Having these and other objects in mind, the invention comprises the novel structural and functional combinations and arrangements of parts described hereafter, particularly pointed out in the subjoined claims, and shown in the accompanying drawing, wherein like parts are designated by identical reference characters throughout the several views, in which Figure 1 is a perspective view of my dental clamp;

Figure 1:
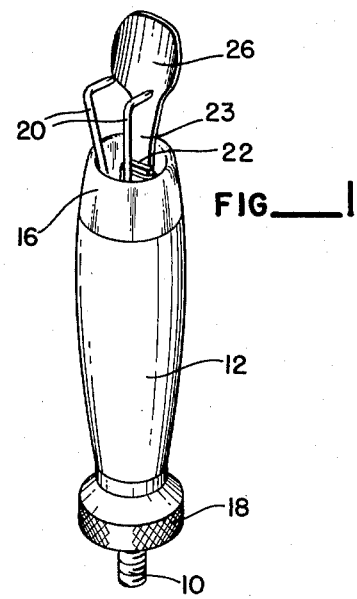
Figure 2:
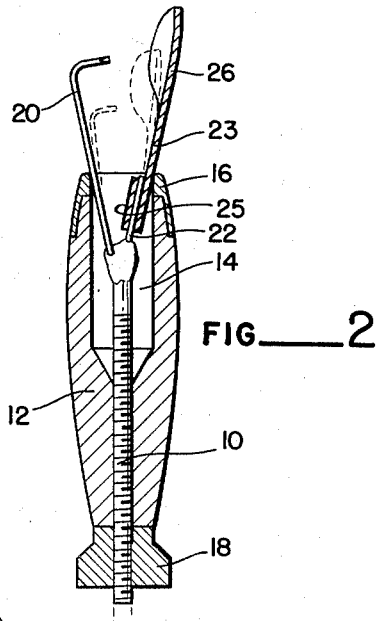
Figure 2 is a longitudinal sectional view of the clamp of Figure 1.
Figure 4:
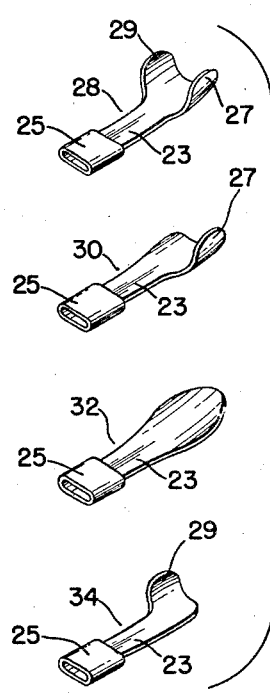
Figure 4 is a bracketed view of a plurality of trays useful in my clamp in substitution for the tray shown in Figure 1.

Referring to Figures 1 and 2 of the drawing, it will be seen that the central pin or link 10, provided with screw threads, is disposed axially within a sleeve 12 that has an enlarged counterbored socket 14 into which one end of the link 10 extends. A rim 16 encircles the outer end of the sleeve socket 14 and nut 18 engages the threads of pin 10 at the opposite end of the sleeve.

Figure 5:
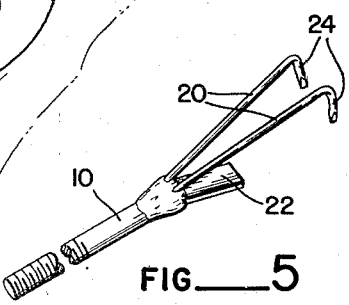
Figure 5 is a perspective view of a jaw supporting link used in my dental clamp.

As shown in Figure 5, pin 10 has welded or otherwise secured thereto a pair of tines 20, 20 and a tenon 22. Each of tines 20 has a claw 24 disposed at right angles to the tine and directed to cross the axis of pin 10. Either or both the tines and the tenon may be formed of spring stock and arranged so that the natural tendency is for the tines and tenon to spread apart from each other.

I provide a variety of trays 26, 28, 30, 32 and 34 for application to the face of a tooth. These various trays differ among themselves due to the shapes of the surfaces that are provided but they are identical to each other to the extent that each includes a shank 23 having a mortise loop 25 which slips over the outer end of tenon 22 on pin 10. All trays are formed of pliable material for easy manual shaping to the particular surface to which they are presented.

Tray 26 is a general purpose tray designed for use on fairly well exposed tooth surfaces and is slightly concavo-convex to press neatly to such a surface.

Tray 28 is similar to tray 26 with the exception that right hand wing 27 and left hand wing 29 have been added on the sides of the tray to permit positioning over a face and the sides of a tooth, in other words, it encompasses a greater portion of tooth than does tray 26.

Tray 30 is a right winged shape whereas tray 34 is a left winged tray. Both are useful where pressure is desired against cavities extending to between teeth.

Tray 32 is a spatulate tray having substantial length and lesser width than the tray 26 of general purpose.

With a tray mounted on tenon 22 in opposition to claws 24, the clamp is shown in Figure 2 in its expanded or unclamped position, with a showing in dotted lines of the device as when the clamping action is obtained.

It will be noted that this clamp is fundamentally the same in function as a collet chuck in that as the socket encloses more of the shank of the trays and tines on pin 10, a more secure and closer clamping action is obtained. And conversely as the nut 18 is run back on screw bar 10 the sleeve 12 is permitted to retract from the jaws and permit them to spread, as when the clamp is being removed from a tooth.

The claws 24 are sharpened so that they may enter into the intermaxillary spaces at the sides of a tooth. Such spaces are indicated by letter S in Figure 3. It is by such engagement that the clamp is securely attached to a tooth and the tray is caused to be brought into close position against the tooth surface. Preferably claws 24 are sharpened into chisel-like points since in that way easy entrance into the intermaxillary spaces may be had without making the claws too sharp or too weak.

Figure 3:
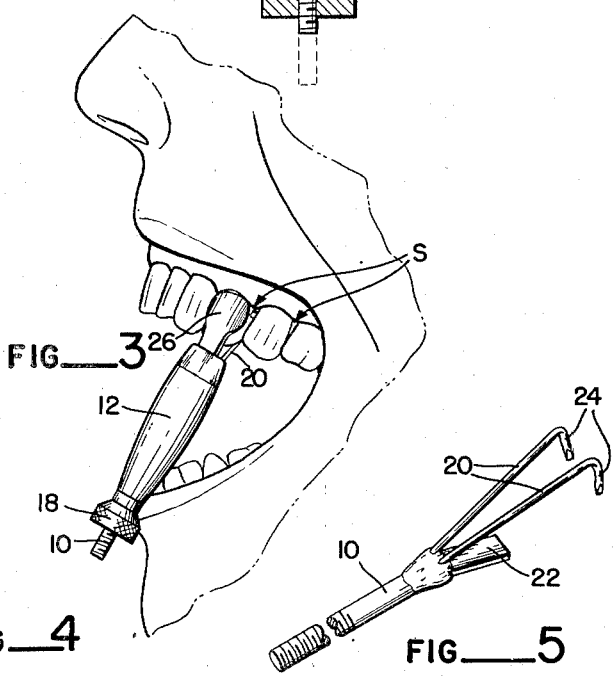
Figure 3 is a view in elevation showing the clamp secured in place to a tooth being filled.

In use, when the dentist has shaped the tray to fairly closely fit the surface to which it is to be presented and has filled the cavity in that surface, the device with the tray in place is engaged upon the tooth. The tines and claws 24 lie on one side of the tooth in a manner to engage in the adjacent intermaxillary spaces at each side of the tooth, and the tray is on the opposite side of the tooth, or pressing on the marginal edges of the tooth as the case may be. Clamping is obtained by tightening the nut 18 on screw bar 10, which causes the sleeve 12 to slide up said bar and forces the socket 14 to compress the tines and tray shank together against their normal resiliency or bias. This action forces the claws into the tooth spaces at the side and presses the tray solidly to the tooth. The device can then be left unattended, as shown in Figure 3, until the setting of the filling has been accomplished.

The removal of the clamp may be very delicately performed by merely slacking off on nut 18 which gradually, and with a high degree of control if that is necessary, permits the tray to withdraw from the tooth and filling surface. If further clamping is required it can easily be accomplished without fear of distortion of the filling or the application of pressures that might cause dislodgment or other damage.

Having thus described my invention, I claim:

1. A dental clamp, comprising: a link having at one end a tray to lie against a tooth being filled; jaw means joined to said link adjacent said tray and including a pair of claws, each directed toward said tray and shaped to enter the intermaxillary space at a side of a tooth being filled; means resiliently urging said tray and claws apart; a collet sleeve having a socket partially enclosing said jaw means and tray and movable on said link; and means cooperable with said link for imparting pressure on the sleeve to move the same and its socket to compress the tray and jaw means into clamping engagement about a tooth being filled.

2. The structure according to claim 1 in which the link is a threaded bar and the means cooperable with said link for imparting pressure on the sleeve is a nut rotatable on said bar and to press against said sleeve.

3. The structure according to claim 1 in which the jaw means comprises a pair of juxtaposed tines each having an angularly disposed claw directed toward the tray.

4. The structure according to claim 1 in which the link supports a tenon and the tray includes a mortise engageable over said tenon to position the trays in opposition to the claws.

5. A dental clamp, comprising: a three-jaw collet chuck in which one of said jaws supports a tray to lie against a tooth surface to be filled and each of the other two jaws includes a claw directed toward said tray, said claws being spaced apart from each other sufficiently that each may enter an intermaxillary space to one side of a tooth against which said tray is caused to lie, and means for effecting clamping of said jaws about a tooth.

LENORE M. TAYLOR.

REFERENCES CITED

The following references are of record in the file of this patent:

UNITED STATES PATENTS

| Number | Name | Date |
|---|---|---|
| 132,946 | Armstrong | Nov. 12, 1872 |
| 430,186 | Johnson | June 14, 1890 |
| 803,045 | Babcock | Oct. 31, 1905 |
| 1,354,139 | Shaw | Sept. 28, 1920 |
| 1,505,684 | Ainsworth | Aug. 19, 1924 |